(12) United States Patent
Liongosari et al.

(10) Patent No.: US 11,455,552 B2
(45) Date of Patent: Sep. 27, 2022

(54) INTELLIGENT DESIGN PLATFORM USING INDUSTRIALIZED EXPERIENCE IN PRODUCT DESIGNS

(71) Applicant: Accenture Global Solutions Limited, Dublin (IE)

(72) Inventors: Edy S. Liongosari, San Jose, CA (US); David William Vinson, San Francisco, CA (US)

(73) Assignee: Accenture Global Solutions Limited, Dublin (IE)

( * ) Notice: Subject to any disclaimer, the term of this patent is extended or adjusted under 35 U.S.C. 154(b) by 467 days.

(21) Appl. No.: 16/691,775

(22) Filed: Nov. 22, 2019

(65) Prior Publication Data

US 2021/0158180 A1    May 27, 2021

(51) Int. Cl.
*G06N 20/00*    (2019.01)
*G06N 5/04*    (2006.01)

(52) U.S. Cl.
CPC .............. *G06N 5/04* (2013.01); *G06N 20/00* (2019.01)

(58) Field of Classification Search
CPC .................................................. G06F 16/5866
See application file for complete search history.

(56) References Cited

U.S. PATENT DOCUMENTS

| 8,266,519 | B2 | 9/2012 | Verma et al. |
| 8,271,870 | B2 | 9/2012 | Verma et al. |
| 8,412,516 | B2 | 4/2013 | Verma et al. |
| 8,442,985 | B2 | 5/2013 | Verma et al. |
| 8,566,731 | B2 | 10/2013 | Subramanian et al. |
| 8,671,101 | B2 | 3/2014 | Verma et al. |

(Continued)

FOREIGN PATENT DOCUMENTS

| CN | 103443787 | 12/2013 |
| EP | 2081118 | 7/2009 |

(Continued)

OTHER PUBLICATIONS

Li et al., "A closed-form solution to photorealistic image stylization," The European Conference on Computer Vision (ECCV), Munich, Germany, Sep. 8-14, 2018, 23 pages.

(Continued)

*Primary Examiner* — Di Xiao
(74) *Attorney, Agent, or Firm* — Fish & Richardson P.C.

(57) ABSTRACT

Implementations for include providing one or more product designs using an intelligent design platform receiving a product indicator that indicates a product that is to be designed, transmitting a request to a contextual requirements system, the request including the product identifier and requesting one or more contextual requirements, determining a set of context models based on the product identifier, each context model in the set of context models being generated based on one or more scenes represented in a digital video, each scene depicting a contextual use of the product, providing a set of contextual requirements to the design generation system based on one or more context models, and inputting a set of aggregate requirements to a generative design tool that generates the one or more product designs based on the set of aggregate requirements, the set of aggregate requirements including at least one contextual requirement.

15 Claims, 6 Drawing Sheets

(56) References Cited

U.S. PATENT DOCUMENTS

| | | | |
|---|---|---|---|
| 8,677,313 | B2 | 3/2014 | Sharma et al. |
| 8,843,819 | B2 | 9/2014 | Verma et al. |
| 9,015,011 | B2 | 4/2015 | Sarkar et al. |
| 9,183,194 | B2 | 11/2015 | Verma et al. |
| 9,384,187 | B2 | 7/2016 | Verma et al. |
| 9,400,778 | B2 | 7/2016 | Ramani et al. |
| 9,535,982 | B2 | 1/2017 | Verma et al. |
| 10,535,164 | B2 | 1/2020 | Shlens et al. |
| 10,769,764 | B2 | 9/2020 | Fang et al. |
| 10,950,021 | B2 | 3/2021 | Dubey et al. |
| 11,074,532 | B1 | 7/2021 | Kennell et al. |
| 11,244,484 | B2 | 2/2022 | Dubey et al. |
| 2014/0351694 | A1 | 11/2014 | Verma et al. |
| 2017/0076179 | A1 | 3/2017 | Martineau et al. |
| 2017/0116373 | A1 | 4/2017 | Ginsburg et al. |
| 2018/0075104 | A1 | 3/2018 | Oberbreckling et al. |
| 2018/0075602 | A1 | 3/2018 | Shen et al. |
| 2018/0082715 | A1 | 3/2018 | Rymkowski et al. |
| 2018/0146257 | A1* | 5/2018 | Seo .................. H04N 21/8126 |
| 2019/0114699 | A1* | 4/2019 | Cook ................. G06Q 30/0621 |
| 2019/0228587 | A1 | 7/2019 | Mordvintsev et al. |
| 2019/0236814 | A1 | 8/2019 | Shlens et al. |
| 2019/0244329 | A1 | 8/2019 | Li et al. |
| 2019/0251616 | A1* | 8/2019 | Yankovich ......... G06Q 30/0621 |
| 2019/0259470 | A1 | 8/2019 | Olafson et al. |
| 2019/0318222 | A1 | 10/2019 | Mallela |
| 2019/0325008 | A1 | 10/2019 | Dubey et al. |
| 2019/0325088 | A1 | 10/2019 | Dubey et al. |
| 2019/0325628 | A1 | 10/2019 | Dubey et al. |
| 2019/0392192 | A1 | 12/2019 | Dubey et al. |
| 2020/0082578 | A1 | 3/2020 | Shlens et al. |
| 2020/0090318 | A1 | 3/2020 | Azoulay et al. |
| 2020/0117348 | A1 | 4/2020 | Jang et al. |
| 2020/0151521 | A1* | 5/2020 | Almazan .............. G06N 3/0454 |
| 2020/0193222 | A1 | 6/2020 | Singh et al. |
| 2020/0219111 | A1 | 7/2020 | Nair et al. |
| 2020/0226651 | A1* | 7/2020 | Rachidi ................ G06K 9/6218 |
| 2020/0242111 | A1 | 7/2020 | Oberbreckling et al. |
| 2020/0250557 | A1 | 8/2020 | Kishimoto et al. |
| 2020/0312042 | A1 | 10/2020 | Sardari et al. |
| 2020/0365239 | A1 | 11/2020 | Sabharwal et al. |
| 2021/0142478 | A1 | 5/2021 | Abhinav et al. |
| 2021/0319039 | A1 | 10/2021 | Gerber, Jr. et al. |
| 2021/0319173 | A1 | 10/2021 | Gerber, Jr. et al. |
| 2021/0365599 | A1 | 11/2021 | Martelaro et al. |

FOREIGN PATENT DOCUMENTS

| | | |
|---|---|---|
| EP | 2296094 | 3/2011 |
| EP | 2362333 | 8/2011 |
| WO | WO 2012106133 | 8/2012 |

OTHER PUBLICATIONS

Feng et al., "MeshNet: Mesh Neural Network for 3D Shape Representation," arXiv, Nov. 28, 2018, arXiv: 1811.11424v1, 9 pages.
Gatys et al., "A Neural Algorithm of Artistic Style," arXiv, Aug. 26, 2015, arXiv:1508.06576v1, 16 pages.
Hanocka et al., "MeshCNN: A Network with an Edge," ACM Trans. Graphics, Feb. 2019, 1(1):90, 12 pages.
Mo et al., "PartNet: A Large-scale Benchmark for Fine-grained and Hierarchical Part-level 3D Object Understanding," Proceedings of the 2019 IEEE/CVF Conference on Computer Vision and Pattern Recognition (CPVR). Jun. 16-20, 2019, Long Beach, California, USA, 909-918.
Qi et al., "PointNet: Deep Learning on Point Sets for 3D Classification and Segmentation/" arXiv, Apr. 10, 2017, arXiv:1612.00593v2, 19 pages.
Szegedy et al., "Going deeper with convolutions/" arXiv, Sep. 17, 2014, arXiv:1409.4842v1, 12 pages.
Szegedy et al.,, "Inception-v4, Inception-ResNet and the Impact of Residual Connections on Learning," arXiv, Aug. 23, 2016, arXiv:1602.07261v2, 12 pages.
Szegedy et al., "Rethinking the Inception Architecture for Computer Vision," arXiv, Dec. 11, 2015, arXiv:1512.00567v3, 10 pages.
Ahmed et al.. "EPN: Edge-Aware PointNet for Object Recognition form Multi-View 2.5D Point Clouds," Proceedings of the IEEE/RSJ International Conference on Intelligent Robots and Systems, Nov. 3-8, 2019, Macau, China, 7 pages.
Chang et al., "ShapeNet: An Information-Rich 3D Model Repository," arXiv, Dec. 9, 2015, arXiv:1512.03012v1, 11 pages.
He et al., "GeoNet: Deep Geodesic Networks for Point Cloud Analysis," arXiv, Jan. 3, 2019, arXiv:1901.00680v1, 11 pages.
Mazeika et al., "Towards 3D Neural Style Transfer," Proceedings of the AAAI Conference on Artificial Intelligence and Interactive Digital Entertainment, Nov. 13-17, 2018, Edmonton, Alberta, Canada, 7 pages.
PointClouds.org [online], "pcl::StatisticalOutlierRemoval< PointT > Class Template Reference," available on or before Aug. 8, 2020, via Internet Archive: Wayback Machine URL<https://web.archive.org/web/20200808065826/https://pointclouds.org/documentation/classpcl_1_1_statistical_outlier_removal.html>, retrieved on Feb. 4, 2021, retrieved from URL<https://pointclouds.org/documentation/classpcl_1_1_statistical_outlier_removal.html>, 7 pages.
PointClouds.org [online], "radius_outlier_removal.h," upon information and belief, available no later than Dec. 17, 2020, retrieved on Feb. 4, 2021, retrieved from URL<https://pointclouds.org/documentation/radius_outlier_removal_8h_source.html>, 5 pages.
Qi et al., "PointNet++: Deep Hierarchical Feature Learning on Point Sets in a Metric Space," arXiv, Jun. 7, 2017, arXiv: 1706.02413v1, 14 pages.
Pham et al., "SceneCut: Joint Geometric and Object Segmentation for Indoor Scenes", May 24, 2018, arXiv:1709.07158v2, 8 pages.
Princeton.edu [online], "Princeton ModelNet," available on or before Mar. 9, 2015 via Internet Archive: Wayback Machine URL<https://web.archive.org/web/20150309054238/https://modelnet.cs.princeton.edu/download.html>, retrieved on Nov. 6, 2020, retrieved from URL<https://modelnet.cs.princeton.edu/download.html>, 3 pages.
Wu et al., "3D ShapeNets: A Deep Representation for Volumetric Shapes," Proceedings of the 2015 IEEE Conference on Computer Vision and Pattern Recognition (CPVR), Jun. 7-12, 2015, Boston, Massachusetts, USA, 1912-1920.
Anny Yuniarti, Nanik Suciati, "A Review of Deep Learning Techniques for 3D Reconstruction of 2D Images", 2019, IEEE (Year: 2019).

* cited by examiner

INTELLIGENT DESIGN PLATFORM USING INDUSTRIALIZED EXPERIENCE IN PRODUCT DESIGNS

BACKGROUND

Product lifecycles can include multiple processes. Example processes can include, without limitation, a design process, a testing process, and a production process. Each process can include one or more phases. For example, an example design process can include a requirements phase, a design phase, an evaluation phase, and a prototyping phase.

In the design phase, a product is designed. Example products can include individual objects (e.g., cup, chair, couch, table) and spaces (e.g., room, vehicle interior). Designs can include wholly original designs, combinations of existing designs, and derivatives of existing designs. In modern design processes, much of the design process is performed using computers and design information stored as data (e.g., multi-dimensional models, images). For example, a designer can use computer-executable design tools to generate designs represented in digital files (e.g., model files, image files).

In the requirements phase of the design process, requirements of the to-be-designed product are defined. Typically, requirements are defined by the designer based on the intended use of the product and the designer's personal knowledge and/or experience of actual use of the product. Requirements can include, for example, size, weight, capacity, materials, and the like. However, other than the designer's personal knowledge and/or experience requirements capturing real-world use and context of use are absent from the design process.

SUMMARY

Implementations of the present disclosure are generally directed to an intelligent design platform for generating product designs based on aggregate requirements. More particularly, implementations of the present disclosure are directed to an intelligent design platform that provides contextual requirements representing industrialized context of a product that is to-be-designed and that aggregates the contextual requirements with designer-provided requirements to provide aggregate requirements. The intelligent design platform generates one or more product designs based on the aggregate requirements.

In some implementations, actions include receiving, by a design generation system of the intelligent design platform, a product indicator that indicates a product that is to be designed, transmitting, by the design generation system, a request to a contextual requirements system of the intelligent design platform, the request including the product indicator and requesting one or more contextual requirements, determining, by the contextual requirements system, a set of context models based on the product indicator, each context model in the set of context models being generated based on one or more scenes represented in a digital video, each scene depicting a contextual use of the product, providing, by the contextual requirements system, a set of contextual requirements to the design generation system based on one or more context models in the set of context models, and inputting, by the design generation system, a set of aggregate requirements to a generative design tool that generates the one or more product designs based on the set of aggregate requirements, the set of aggregate requirements including at least one contextual requirement from the set of contextual requirements. Other implementations include corresponding systems, apparatus, and computer programs, configured to perform the actions of the methods, encoded on computer storage devices.

These and other implementations can each optionally include one or more of the following features: actions further include receiving a superset of tagged images including images responsive to the product indicator, and defining a set of tagged images including tagged images from the superset of tagged images, the set of tagged images being defined based on a distribution of context represented in tags of the tagged images, context models being provided based on the set of tagged images; each tagged image depicts a respective scene represented in a digital video; the distribution is one of even and uneven; actions further include providing context models by processing tagged images using photogrammetry; actions further include receiving designer-provided requirements, and providing the set of aggregate requirements based on the designer-provided requirements and the set of contextual requirements, the set of aggregate requirements comprising at least one designer-provided requirement; and providing the set of aggregate requirements based on the designer-provided requirements and the set of contextual requirements includes comparing each of the designer-provided requirements to contextual requirements in the set of contextual requirements to selectively include the at least one contextual requirement from the set of contextual requirements in the set of aggregate requirements.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure are generally directed to an intelligent design platform for generating product designs based on aggregate requirements. More particularly, implementations of the present disclosure are directed to an intelligent design platform that provides contextual requirements representing industrialized context of a product that is to-be-designed and that aggregates the contextual requirements with designer-provided requirements to provide aggregate requirements. The intelligent design platform generates one or more product designs based on the aggregate requirements. In some implementations, actions include receiving, by a design generation system of the intelligent design platform, a product indicator that indicates a product that is to be designed, transmitting, by the design generation system, a request to a contextual requirements system of the intelligent design platform, the request including the product indicator and requesting one or more contextual requirements, determining, by the contextual requirements system, a set of context models based on the product indicator, each context model in the set of context models being generated based on one or more scenes represented in a digital video, each scene depicting a contextual use of the product, providing, by the contextual requirements system, a set of contextual requirements to the design generation system based on one or more context models in the set of context models, and inputting, by the design generation system, a set of aggregate requirements to a generative design tool that generates the one or more product designs based on the set of aggregate requirements, the set of aggregate requirements including at least one contextual requirement from the set of contextual requirements.

To provide context for implementations of the present disclosure, and as introduced above, a product lifecycle can include multiple processes. Example processes can include, without limitation, a design process, a testing process, and a production process. Each process can include one or more phases. For example, an example design process can include a requirements phase, a design phase, an evaluation phase, and a prototyping phase. In some examples, the requirements phase includes provision of a high-level outline (e.g., notes, sketches) of the product including requirements (e.g., expected features, functions, and the like). In some examples, the design phase can include producing a product design based on the requirements. For example, modeling tools (e.g., Creo, AutoCAD, Catia, SolidWorks, Onshape) to produce computer-implemented models (e.g., 2D/3D models) of the product. In some examples, the evaluation phase can include evaluating the product model (e.g., FEA, CFD, MBD, structural analysis, thermal analysis, stability analysis) using evaluation tools (e.g., Ansys, Hypermesh, Hyperworks) to identify strengths/weaknesses, and/or whether the product model meets the requirements. In some examples, the prototyping phase includes producing a physical prototype of the product based on the product design. For example, the product model is converted to code for CNC machining, and/or 3D using one or more prototyping tools (e.g., Creo, DellCAM, MasterCAM).

In the requirements phase of the design process, requirements of the to-be-designed product are defined. Typically, requirements are defined by the designer based on the intended use of the product and the designer's personal knowledge and/or experience of actual use of the product. Requirements can include, for example, size, weight, capacity, materials, and the like. However, other than the designer's personal knowledge and/or experience, requirements representing real-world use and context of use of a product, which can collectively be referred to as industrialized context, are absent from the design process.

In view of this, implementations of the present disclosure provide an intelligent design platform for generating product designs based on aggregate requirements. More particularly, implementations of the present disclosure are directed to an intelligent design platform that provides contextual requirements representing industrialized context of a product that is to-be-designed and that aggregates the contextual requirements with designer-provided requirements to provide aggregate requirements. The intelligent design platform generates one or more product designs based on the aggregate requirements.

Figure 1:
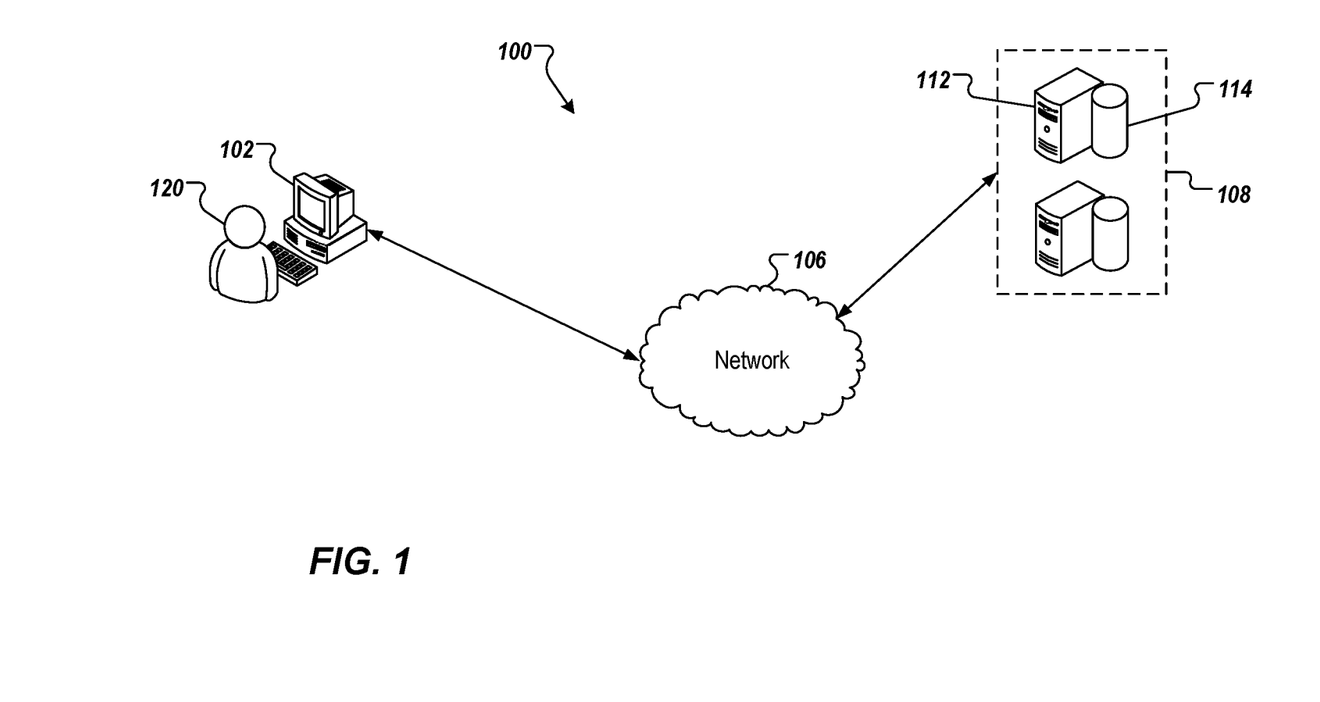
FIG. 1 depicts an example system that can execute implementations of the present disclosure.

FIG. 1 depicts an example system 100 that can execute implementations of the present disclosure. The example system 100 includes a computing device 102, a back-end system 108, and a network 106. In some examples, the network 106 includes a local area network (LAN), wide area network (WAN), the Internet, or a combination thereof, and connects web sites, devices (e.g., the computing device 102), and back-end systems (e.g., the back-end system 108). In some examples, the network 106 can be accessed over a wired and/or a wireless communications link. For example, mobile computing devices, such as smartphones can utilize a cellular network to access the network 106.

In the depicted example, the back-end system 108 includes at least one server system 112, and data store 114 (e.g., database and knowledge graph structure). In some examples, the at least one server system 112 hosts one or more computer-implemented services that users can interact with using computing devices. For example, the server system 112 can host one or more applications that are provided as part of an intelligent design platform in accordance with implementations of the present disclosure.

In some examples, the computing device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In the context of the present disclosure, a user 120 can use the computing device 102 to interact with the intelligent design platform hosted on the back-end system 108. For example, the user 120 can input a set of designer-provided requirements that are processed by the intelligent design platform to provide one or more product designs, as described in detail herein.

Implementations of the present disclosure are described in further detail herein with reference to an example product that is to be designed using the intelligent design platform. It is contemplated, however, that implementations of the present disclosure can be realized with any appropriate product. The example product includes a coffee cup.

Example designer-provided requirements for a coffee cup can include, without limitation, a size (e.g., dimensions envelope), a weight (e.g., dry weight range), a capacity (e.g., fluid volume), materials, and temperature capacity (e.g., −10° C. to 150° C.). In some examples, one or more of the designer-provided requirements are based on the designer's personal knowledge and/or experience. For example, the weight requirement can be provided based on the designer's personal knowledge that coffee cups should be less than a particular weight (e.g., for cost-effective shipment, for ability of users to hold and manipulate the coffee cup during use).

As described in further detail herein, the intelligent design platform of the present disclosure captures industrialized context of products, which includes real-world use and context of use. Examples of industrialized context include, without limitation, residential use of a product (e.g., use with residential machinery, storage in a residential setting), commercial use of a product (e.g., use with commercial machinery, storage in a commercial setting), seasonal use of a product (e.g., spring, summer, fall, winter), environmental use of a product (e.g., warm weather, cold weather), personal use of a product (e.g., how a person interacts with the product). With reference to the example product, industrialized context can include, without limitation, residential use of coffee cups (e.g., storage of coffee cups in kitchen cupboards/on cup stands, use of coffee cups with residential coffee makers), commercial use of coffee cups (e.g., storage of coffee cups on open shelving, stacking of coffee cups, use of coffee cups with commercial coffee makers), and personal use of a coffee cup (e.g., holding coffee cups with one hand, two hands, using handle(s), not using handle(s), using one finger, using two fingers, using three fingers).

In accordance with implementations of the present disclosure, and as described in detail herein, scenes from videos depicting presence and/or use of a product are identified. In some examples, a scene is represented in a digital image, which can be provided as a frame of a video. In some implementations, a set of scenes is selected and, for each scene in the set of scenes, a multi-dimensional context model (e.g., three-dimensional (3D) model) is provided and included in a set of context models. In some implementations, one or more context models are selected from the set of context models, and one or more contextual requirements are extracted from each of the one or more context models. In some implementations, a set of contextual requirements is provided to the intelligent design platform, which aggregates the contextual requirements with designer-provided requirements to provide aggregate requirements. The intelligent design platform provides a set of product designs based on the aggregate requirements.

Figure 2:
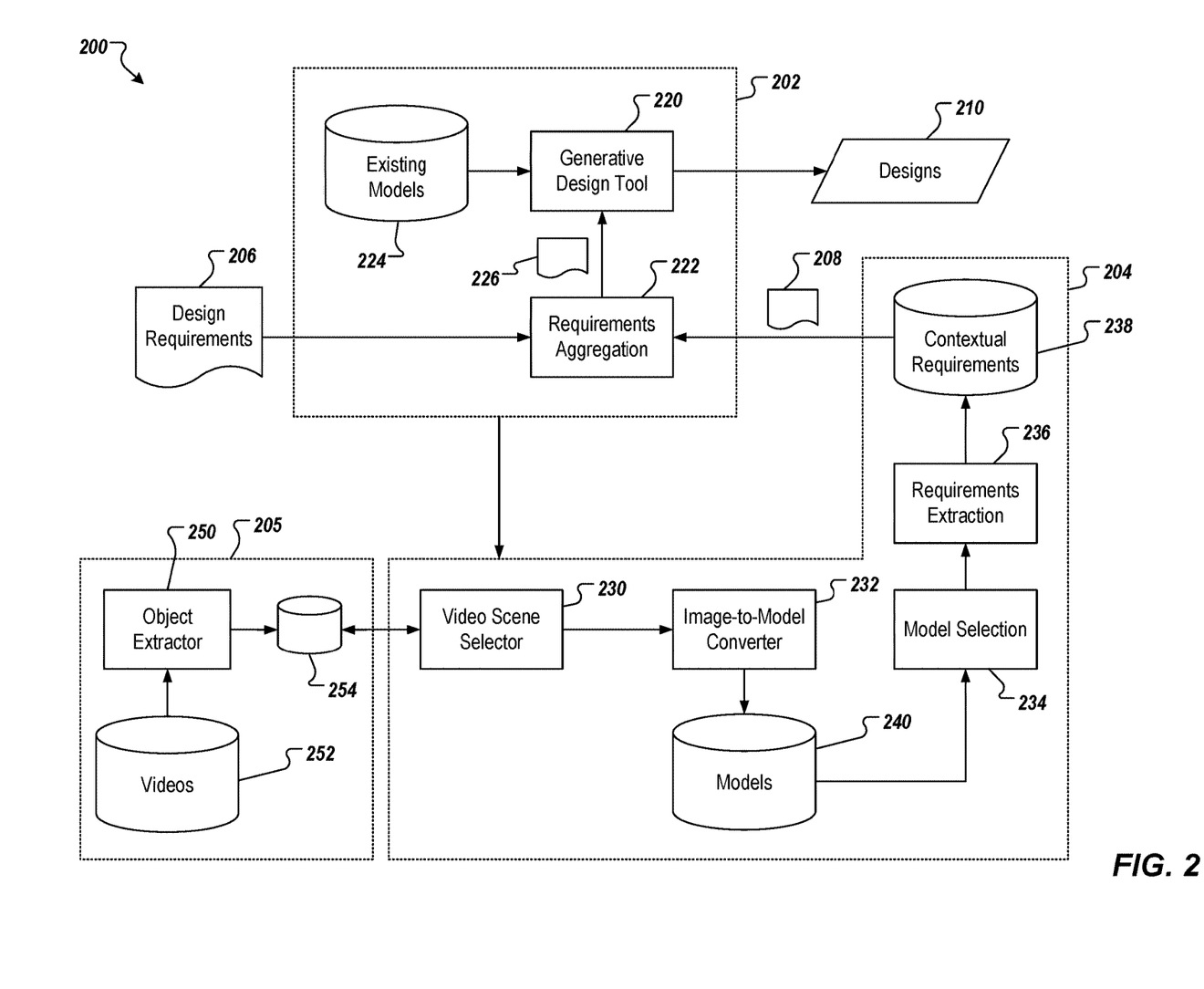
FIG. 2 depicts a block diagram of an intelligent design platform in accordance with implementations of the present disclosure.

FIG. 2 depicts a block diagram of an intelligent design platform 200 in accordance with implementations of the present disclosure. The intelligent design platform 200 includes a design generation system 202 and a contextual requirements system 204. In some examples, the intelligent design platform 200 includes a scene provision system 205. In some examples, the scene provision system 205 is provided by a third-party service provider.

In some implementations, the design generation system 202 receives design requirements 206 for a product from a designer (e.g., a user that designs the product) and contextual requirements 208 for the product from the contextual requirements system 204. The design generation system 202 processes the design requirements 206 and the contextual requirements 208 to provide one or more product designs 210. In some examples, each of the design requirements 206 and the contextual requirements 208 is provided in a respective computer-readable file. In some examples, the one or more product designs 210 are each provided as a multi-dimensional model (e.g., three-dimensional (3D) model) stored within one or more computer-readable files. In some examples, each of the one or more product designs 210 includes metadata describing characteristics of the respective product design (e.g., color(s), material(s)).

In further detail, and as depicted in FIG. 2, the design generation system 202 includes a generative design tool 220, a requirements aggregation module 222, and a model store 224. In some examples, the requirements aggregation module 222 receives the design requirements 206 and the contextual requirements 208 and provides aggregate requirements 226 based thereon. In some examples, the generative design tool 220 processes one or more existing models in view of the aggregate requirements 226 to provide the one or more product designs 210. In some examples, one or more models can be selected from the model store 224 based on the product that is to-be-designed. For example, and with reference to the example product, one or more coffee cup models can be selected from the model store 224. In some examples, one or more models can be automatically selected. For example, the generative design tool 220 queries the model store 224 based on a query that indicates a product (e.g., coffee cup) and a set of models (e.g., one or more coffee cup models) responsive to the query is returned. In some examples, one or more models can be manually selected. For example, a designer interacting with the intelligent design platform 200 can select one or more models from the model store 224 for processing by the generative design tool 206.

With continued reference to FIG. 2, the requirements generation system 204 includes a video scene selector 230, an image-to-model converter 232, a model selection module 234, and a requirements extraction module 236. As described in further detail herein, the requirements generation system 204 automatically generates contextual requirements for each of a plurality of products and stores these contextual requirements in a contextual requirements store 238. More particularly, and as described in further detail herein, a set of scenes is selected from the scene provision system 205 by the video scene selector 230. In some examples, a scene is represented in a digital image (e.g., a frame of a video). For each scene in the set of scenes, a multi-dimensional context model (e.g., 3D model) is provided and is stored within a context models store 240. In some implementations, one or more context models are selected from the context models store 240 by the model selection module 234. One or more contextual requirements are extracted from each of the one or more context models by the requirements extraction module 236 and are stored in the contextual requirements store 238.

In the example of FIG. 2, the scene provision system 205 includes an object extractor 250, a video store 252, and a tagged scene store 254. In some examples, the object extractor 250 processes one or more videos stored within the video store 252 to identify one or more objects depicted in the videos and tag videos (e.g., scenes in videos) with tags representing respective objects. In some examples, videos in the video store 252 can be provided from one or more video sources. Example video sources can include, without limitation, videos posted to social media, movies, and videos recorded by surveillance cameras (e.g., surveillance cameras located in coffee shops). In some examples, the object extractor 250 processes each video to identify objects in the video and/or contextual features represented in the video and tags the video, or respective frames of the video, with one or more tags, each tag representing an object and/or a contextual feature.

In some examples, the object extractor 250 executes a video tagging application provided by a third-party. Any appropriate video tagging application can be used to provide tagged images of scenes from the videos. In some examples, the video tagging application processes one or more frames of a video through a tagging process. Each frame can be provided as an image (e.g., a digital image). The tagging process identifies objects within an image and tags each object with a respective tag indicating what the object is to provide a tagged image. The tagged images are stored in the tagged scene store 254. In some examples, the videos processed by the object extractor 250 for tagging are not specific to any particular subject matter. In this manner, the tagged images stored within the tagged scene store 254 are agnostic to any particular subject matter.

Figure 3A:
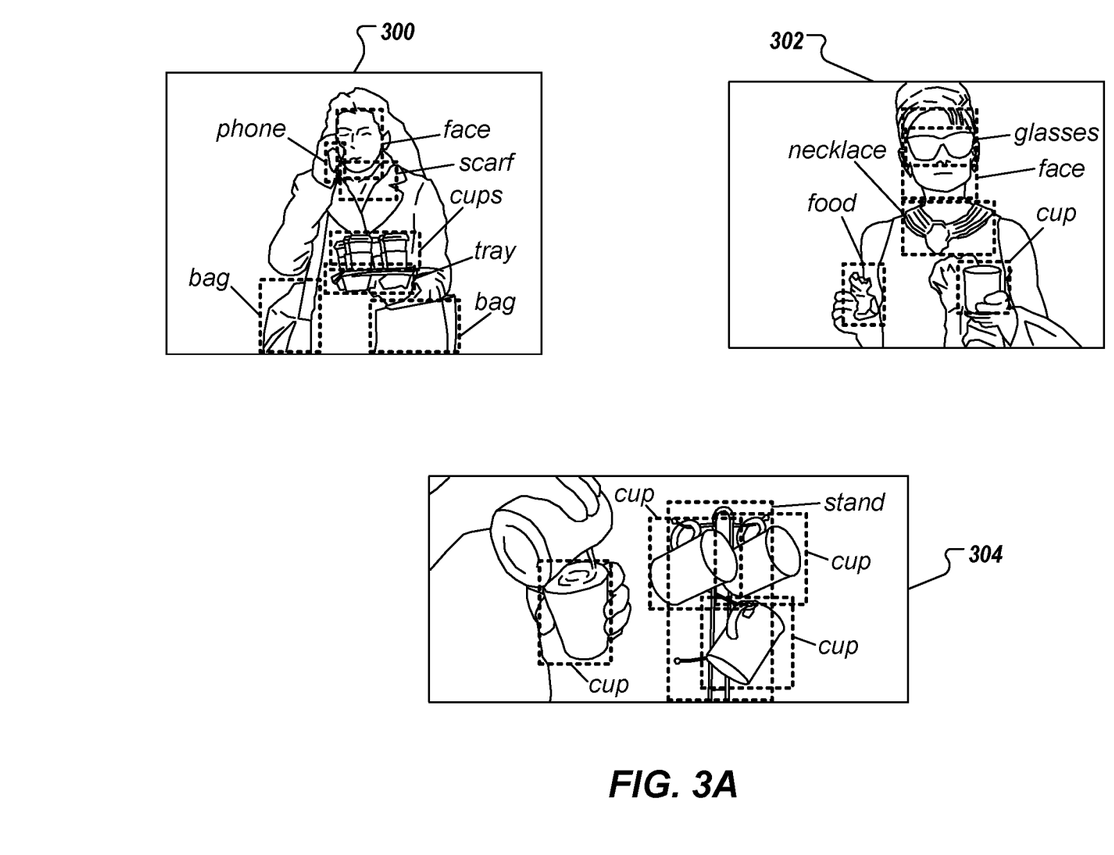
FIG. 3A depicts example tagged images representative of respective scenes from videos.

FIG. 3A depicts example tagged images 300, 302, 304 representative of respective scenes from videos. In the example of FIG. 3A, the tagged image 300 depicts an outdoor scene in cold weather of a woman using a phone and carrying multiple bags and a tray of coffee cups. The example tags include face, phone, cups, tray, scarf, and bag. The tagged image 300 can be provided from a video posted to social media, for example. In the example of FIG. 3A, the tagged image 302 depicts an indoor scene of a woman eating food and holding a cup. The example tags include face, food, cup, necklace, and glasses. The tagged image 302 can be provided from a movie, for example. In the example of FIG. 3A, the tagged image 304 depicts an indoor scene of a liquid being poured into a cup near a stand, from which multiple cups hang. The example tags include cup and stand. The tagged image 304 can be provided from a surveillance video within a coffee shop, for example.

In some implementations, besides tags, each of the tagged images can be provided with additional contextual information. For example, each tagged image can be provided with metadata representing contextual information for the scene depicted in the tagged image. Example metadata can include location data (e.g., a location where the image was recorded, GPS coordinates) and temporal data (e.g., time/date). For example, and with reference to the tagged image 300, example metadata can indicate that the scene depicted is in New York City and was recorded on Dec. 10, 2019. Based on the example metadata, additional metadata can be determined. For example, it can be determined that the season is winter. As another example, the location metadata and temporal metadata can be used to query an ancillary data source to provide additional metadata. For example, New York City and Dec. 10, 2019 can be used to query a third-party weather service, which can provide weather data (e.g., temperature data), which can also be included in the metadata of the tagged image 300. As another example, and with reference to the tagged image 304, example metadata can indicate that the scene depicted is in Chicago and was recorded at ACME Coffee Shop on Nov. 2, 2019. In some examples, the example metadata can be provided from the surveillance camera that recorded the scene.

In the example of FIG. 3A, the tagged images 300, 302, 304 are agnostic to any particular subject matter. That is, although each depicts a cup, the tagged images 300, 302, 304 were not generated specifically because of the presence of a cup in each. Accordingly, each of the tagged images 300, 302, 304 could be used with the intelligent design system to generate product designs for a number of different types of products (e.g., phones, bags, trays, sunglasses, necklaces, stands). It is also appreciated that, while three examples of tagged images are depicted in FIG. 3A, the tagged scene store 354 can store any appropriate number of tagged images (e.g., hundreds, thousands, millions).

In accordance with implementations of the present disclosure, the video scene selector 230 receives tagged images (scenes) from the scene provision system 205. For example, a product indicator can be provided (e.g., from the design generation system 202), which indicates a product that is to-be-designed. In some examples, the video scene selector 230 queries the scene provision system 205 based on the product indicator and receives a superset of tagged images that includes tagged images responsive to the query. For example, the superset of tagged images can include tens, hundreds, or thousands of tagged images. Continuing with the example product, the product indicator can include coffee cup, and each tagged image in the superset of tagged images includes at least one tag representative of coffee cup.

In some implementations, the video scene selector 230 processes the superset of tagged images to provide a set of tagged images (e.g., the set of tagged images being a sub-set of the superset of tagged images). For example, the set of tagged images can include tens or hundreds of tagged images. In some examples, the video scene selector 230 selects tagged images for inclusion in the set of tagged images based on one or more tags and/or metadata assigned to each image. In some examples, the video scene selector 230 selects tagged images for inclusion in the set of tagged images to achieve a particular distribution (diversity) of tags and/or context. For example, the video scene selector 230 selects tagged images to achieve a relatively even distribution of context (e.g., half of the tagged images in the set of tagged images representing residential use, half of the tagged images in the set of tagged images representing commercial use). For example, the product indicator provided to the requirements generation system 204 does not indicate either commercial use or residential use. Consequently, the video scene selector 230 selects tagged images to achieve a relatively even distribution. As another example, the video scene selector 230 selects tagged images to achieve an uneven distribution of context (e.g., few to no tagged images in the set of tagged images representing residential use, most to all of the tagged images in the set of tagged images representing commercial use). For example, the product indicator provided to the requirements generation system 204 can indicate that the design is for commercial use. Consequently, the video scene selector 230 selects tagged images to achieve a relatively uneven distribution.

While example contexts (e.g., residential use, commercial use) are discussed above to achieve example distributions, it is contemplated that any appropriate tags and/or contexts can be used to provide any appropriate distributions across the tagged images in the set of tagged images. Further, multiple distributions can be considered in selecting tagged images to be included in the set of tagged images. For example, for a first context an uneven distribution is provided, and for a second context an even distribution is provided (e.g., tagged images are selected for an uneven distribution favoring commercial use and for an even distribution of indoor versus outdoor scenes).

In some implementations, the set of tagged images is provided to the image-to-model converter 232. In some examples, the image-to-model converter 232 processes one or more tagged images in the set of tagged images to provide a respective context model that is stored in the context models store 240. In some examples, each image (absent tag(s)) is processed by the image-to-model converter 232 using photogrammetry to provide a respective context model. Photogrammetry can be described as a process for determining 3D information from 2D images. In the context of implementations of the present disclosure, photogrammetry is used to provide a context model, as a 3D model, based on images in the set of tagged images. It is contemplated that any appropriate photogrammetry software can be used to provide the context models from the set of tagged images.

In some implementations, each context model is associated with the tag(s) and metadata of the underlying tagged image(s), from which the context model is provided. In some implementations, the image-to-model converter 232 provides context tags (e.g., as metadata) to be associated with the context model. For example, the context model can be processed to identify objects and metadata associated with objects represented within the context model. Each context model is representative of a scene, which can include multiple objects, as described herein. In some examples, the additional tags and/or metadata can indicate an object and features of the object. For example, dimensions of an object can be determined from the context model, which dimensions can be provided as metadata to the context model. Continuing with the example product, dimensions of a coffee cup within a scene can be determined, as well as features of the coffee cup (e.g., number of handles). Further, other objects relevant to the product within the scene can be identified as well as features of the other objects. For example, one or more hands holding a coffee cup can be identified and the number of hands can be a feature represented in metadata.

Figure 3B:
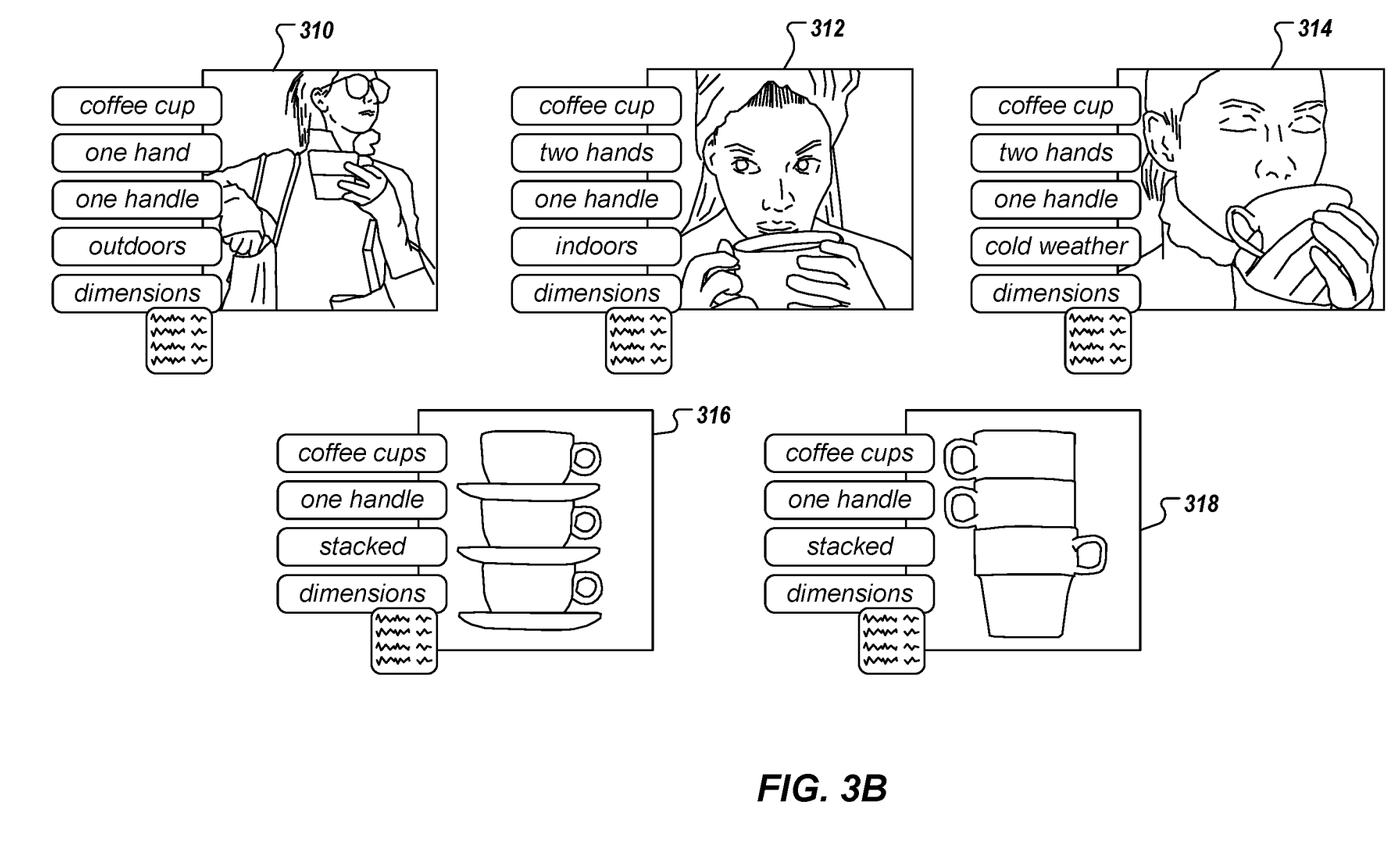
FIG. 3B depicts example scenes and example context tags in accordance with implementations of the present disclosure.

FIG. 3B depicts example scenes 310, 312, 314, 316, 318 and example context tags (metadata) in accordance with implementations of the present disclosure. In the example of FIG. 3B, the scenes 310, 312, 314, 316, 318 correspond to respective context models provided by the image-to-model converter 232. In the depicted examples, context tags (e.g., one hand, one handle, stacked, held) are provided based on the context model. For example, the context model associated with the scene 312 can be processed to identify a coffee cup having a single handle and being held by two hands. Further, dimensions of an object (e.g., coffee cup) can be determined from the context model and provided as a context tag (metadata).

In some implementations, a set of context models (and associated tags/metadata) is retrieved from the context models store 240 by the model selection module 234. In some examples, the model selection module 234 selects context models for inclusion in the set of context models to achieve a particular distribution (diversity) of tags and/or context. For example, the model selection module 234 selects context models to achieve a relatively even distribution of context (e.g., a third of the context models in the set of context models representing use of two hands, a third of the context models in the set of context models representing use of one hand, a third of the context models in the set of context models representing use of no hands (cup not being held)). As another example, the model selection module 234 selects context models to achieve a relatively uneven distribution of context (e.g., most or all of the context models in the set of context models representing use of two hands, few to none of the context models in the set of context models representing use of one hand, few to none the context models in the set of context models representing use of no hands (cup not being held)).

In some implementations, the context models and associated tags/metadata are processed by the requirements extraction module 236 to provide contextual requirements that are stored in the contextual requirements store 238. In some examples, contextual requirements are extracted in the form of metadata tags from various sources including physical constraints derived from the object model as well as probabilistic social constraints and other contextual constraints from the model built using the various scenes within which the object is presented. For example, certain types of cups are held in certain types of situations; the probability that a cup has the physical property of being made of paper is a constraint on the cup given specific social and physical contexts such as being on a cold city street.

In some implementations, the extracted contextual requirements are also provided to the design generation system 202 as the contextual requirements 208. For example, at the outset of a design session, a designer can provide a product indicator that indicates a product (e.g., coffee cup) that is to be designed using the design generation system 202. In some examples, the designer can also provide context information (e.g., commercial use) for the to-be-designed product. In some examples, the design generation system 202 automatically queries the contextual requirements system 204 for contextual requirements. For example, the design generation system 202 automatically submits a query to the contextual requirements system 204, the query including the product indicator and the context information, if any. In response to receiving the query, the contextual requirements system 204 retrieves tagged images from the scene provision system 205 and processes the tagged images, as described herein, to provide the contextual requirements 208, which are returned to the design generation system 202.

As introduced above, the requirements aggregation module 222 receives the designer-provided requirements 206 and the contextual requirements 208 and provides aggregate requirements 226 based thereon. In some examples, the requirements aggregation module 222 compares designer-provided requirements to contextual requirements. In some examples, any designer-provided requirements that are absent from the contextual requirements are included in the aggregate requirements 226. In some examples, any contextual requirements that are absent from the designer-provided requirements are included in the aggregate requirements 226. In some examples, any conflict between designer-provided requirements and the contextual requirements can be automatically or manually resolved. For example, if a designer-provided requirement conflicts with a contextual requirement, the designer-provided requirement can be automatically selected by the requirements aggregation module 222 for inclusion in the aggregate requirements 226. As another example, if a designer-provided requirement conflicts with a contextual requirement, the requirements aggregation module 222 can alert the designer and the designer can select which of the designer-provided requirement or the contextual requirement is to be included in the aggregate requirements 226.

As also introduced above, the generative design tool 220 processes one or more existing models in view of the aggregate requirements 226 to provide the one or more product designs 210. The generative design tool 220 can include any appropriate generative design tool including available third-party generative design tools. For purposes of the instant discussion, the generative design 220 receives the aggregate requirements 226 and one or more existing models (e.g., selected by the designer) as input, and provides the one or more product designs 210 as output. In some implementations, the designer reviews the one or more product designs 210 and can select at least one product design 210 for further processing (e.g., producing a prototype based on the at least one product design 210).

In some implementations, the designer can initiate another iteration of the design process. For example, if the designer is not satisfied with the one or more product designs 210 (or otherwise would like to generate additional product designs), the designer can provide manual input to the contextual requirements system 204 to curate the resulting contextual requirements 208. As one example, the designer can provide input to the contextual requirements system 204 to affect a distribution of the tagged images in the set of tagged images. For example, during an initial iteration, the contextual requirements system 204 automatically selects tagged images for inclusion in the set of tagged images to provide an even distribution. In a subsequent iteration, the designer can select an uneven distribution (e.g., only residential), such that tagged images selected for inclusion in the set of tagged images to reflect the uneven distribution. As another example, the designer can curate the tagged images included in the set of tagged images by manually selecting (e.g., adding/removing) tagged images for inclusion in the set of tagged images. This designer-driven intervention can also be realized in selection of the context models, from which the contextual requirements are provided.

Figure 4:
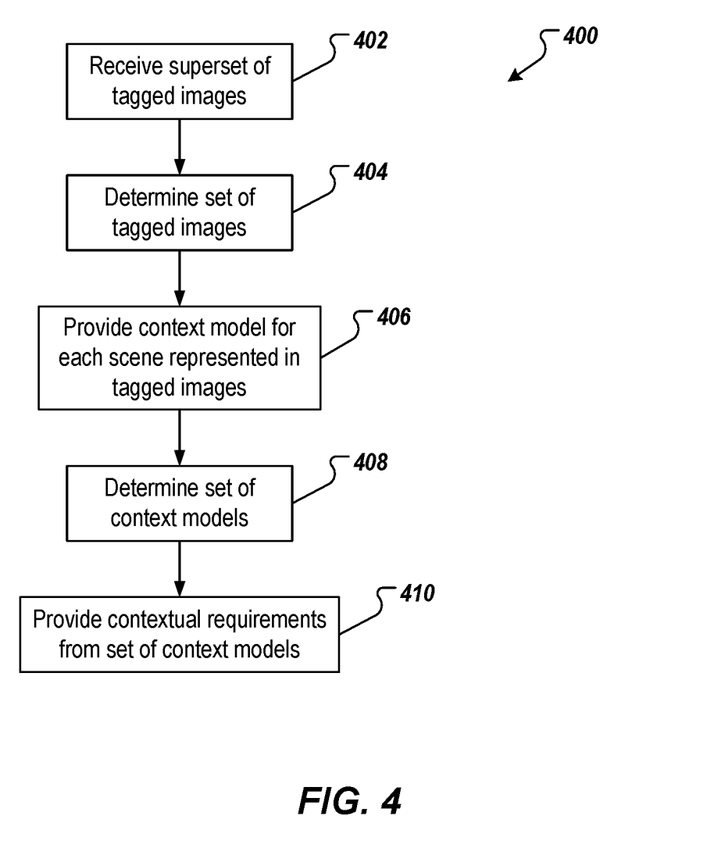
FIG. 4 depicts an example process that can be executed in accordance with implementations of the present disclosure.

FIG. 4 depicts an example process 400 that can be executed in accordance with implementations of the present disclosure. In some examples, the example process 400 is provided using one or more computer-executable programs executed by one or more computing devices.

A superset of tagged images is received (402). For example, and as described herein, the video scene selector 230 of the contextual requirements system 204 queries the scene provision system 205 based on a product indicator (e.g., coffee cup) and receives a superset of tagged images that includes tagged images responsive to the query. A set of tagged images is determined (404). For example, and as described herein, the video scene selector 230 of the contextual requirements system 204 processes the superset of tagged images to provide a set of tagged images. In some examples, the video scene selector 230 selects tagged images for inclusion in the set of tagged images based on one or more tags and/or metadata assigned to each image. In some examples, the video scene selector 230 selects tagged images for inclusion in the set of tagged images to achieve a particular distribution (diversity) of tags and/or context.

A context model is provided for each scene represented in the set of tagged images (406). For example, and as described herein, the set of tagged images is provided to the image-to-model converter 232 of the contextual requirements system 204. In some examples, the image-to-model converter 232 processes one or more tagged images in the set of tagged images to provide a respective context model that is stored in the context models store 240. In some examples, each image (absent tag(s)) is processed by the image-to-model converter 232 using photogrammetry to provide a respective context model. In the context of implementations of the present disclosure, photogrammetry is used to provide a context model, as a 3D model, based on images in the set of tagged images.

A set of context models is determined (408). For example, and as described herein, the set of context models (and associated tags/metadata) is retrieved from the context models store 240 by the model selection module 234 of the contextual requirements system 204. In some examples, the model selection module 234 selects context models for inclusion in the set of context models to achieve a particular distribution (diversity) of tags and/or context. One or more contextual requirements are provided from the set of context models (410). For example, and as described herein, the context models and associated tags/metadata are processed by the requirements extraction module 236 of the contextual requirements system 204 to provide contextual requirements that are stored in the contextual requirements store 238.

Figure 5:
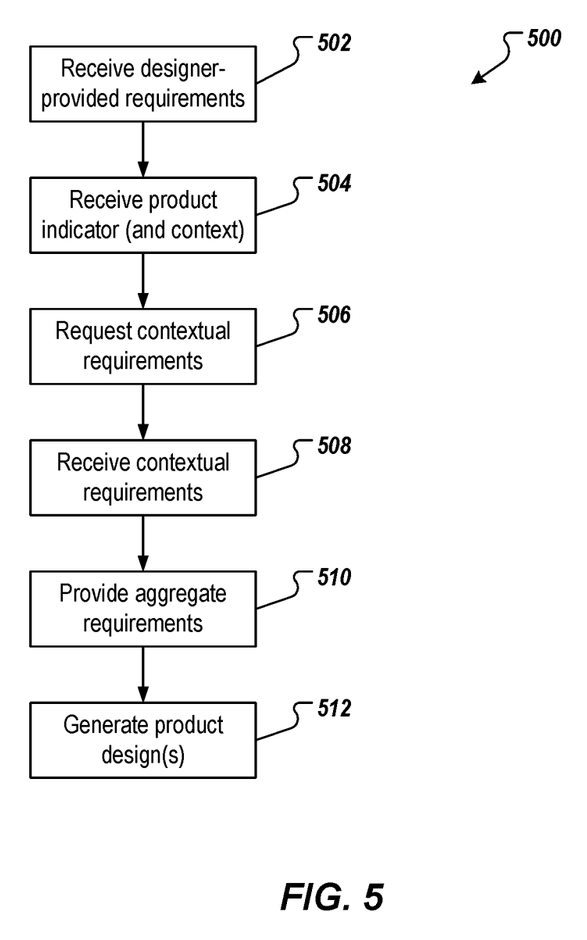
FIG. 5 depicts an example process that can be executed in accordance with implementations of the present disclosure.

FIG. 5 depicts an example process 500 that can be executed in accordance with implementations of the present disclosure. In some examples, the example process 500 is provided using one or more computer-executable programs executed by one or more computing devices.

One or more designer-provided requirements are received (502). A product indicator is received (504). In some examples, a context is also received. For example, and as described herein, at the outset of a design session, a designer can provide designer-provided requirements and a product indicator that indicates a product (e.g., coffee cup) that is to be designed using the design generation system 202. In some examples, the designer can also provide a context (e.g., residential or commercial). In some examples, the designer-provided requirements are based on the designer's personal knowledge and experience of use and context of use of the product that is to be designed.

Contextual requirements are requested (506). For example, and as described herein, the design generation system 202 automatically queries the contextual requirements system 204 for contextual requirements. For example, the design generation system 202 automatically submits a query to the contextual requirements system 204, the query including the product indicator and the context information, if any. Contextual requirements are received (508). For example, and as described herein, in response to receiving the query from the design generation system 202, the contextual requirements system 204 retrieves tagged images from the scene provision system 205 and processes the tagged images, as described herein, to provide the contextual requirements 208, which are returned to the design generation system 202.

Aggregate requirements are provided (510). For example, and as described herein, the requirements aggregation module 222 receives the designer-provided requirements 206 and the contextual requirements 208 and provides aggregate requirements 226 based thereon. In some examples, the requirements aggregation module 222 compares designer-provided requirements to contextual requirements. In some examples, any designer-provided requirements that are absent from the contextual requirements are included in the aggregate requirements 226. In some examples, any contextual requirements that are absent from the designer-provided requirements are included in the aggregate requirements 226. In some examples, any conflict between designer-provided requirements and the contextual requirements can be automatically or manually resolved. For example, if a designer-provided requirement conflicts with a contextual requirement, the designer-provided requirement can be automatically selected by the requirements aggregation module 222 for inclusion in the aggregate requirements 226. As another example, if a designer-provided requirement conflicts with a contextual requirement, the requirements aggregation module 222 can alert the designer and the designer can select which of the designer-provided requirement or the contextual requirement is to be included in the aggregate requirements 226.

One or more product designs are generated (512). For example, and as described herein, the generative design tool 220 processes one or more existing models in view of the aggregate requirements 226 to provide the one or more product designs 210. The generative design 220 receives the aggregate requirements 226 and one or more existing models (e.g., selected by the designer) as input, and provides the one or more product designs 210 as output. In some implementations, the designer reviews the one or more product designs 210 and can select at least one product design 210 for further processing (e.g., producing a prototype based on the at least one product design 210). In some implementations, the designer can initiate another iteration of the design process, as described herein.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the to be filed claims.

What is claimed is:

1. A computer-implemented method for providing one or more product designs using an intelligent design platform, the method comprising:
   receiving, by a design generation system of the intelligent design platform, a product indicator that indicates a product that is to be designed;
   receiving a superset of tagged images comprising images responsive to the product indicator;
   defining a set of tagged images comprising tagged images from the superset of tagged images, the set of tagged images being defined based on a distribution of context represented in tags of the tagged images, wherein the distribution is one of even and uneven;
   transmitting, by the design generation system, a request to a contextual requirements system of the intelligent design platform, the request comprising the product indicator and requesting one or more contextual requirements;
   determining, by the contextual requirements system, a set of context models based on the product indicator and the set of tagged images, each context model in the set of context models being generated based on one or more scenes represented in a digital video, each scene depicting a contextual use of the product;
   providing, by the contextual requirements system, a set of contextual requirements to the design generation system based on one or more context models in the set of context models; and
   inputting, by the design generation system, a set of aggregate requirements to a generative design tool that generates the one or more product designs based on the set of aggregate requirements, the set of aggregate requirements comprising at least one contextual requirement from the set of contextual requirements.

2. The method of claim 1, wherein each tagged image depicts a respective scene represented in a digital video.

3. The method of claim 1, further comprising providing context models by processing tagged images using photogrammetry.

4. The method of claim 1, further comprising:
   receiving designer-provided requirements; and
   providing the set of aggregate requirements based on the designer-provided requirements and the set of contextual requirements, the set of aggregate requirements comprising at least one designer-provided requirement.

5. The method of claim 4, wherein providing the set of aggregate requirements based on the designer-provided requirements and the set of contextual requirements comprises comparing each of the designer-provided requirements to contextual requirements in the set of contextual requirements to selectively include the at least one contextual requirement from the set of contextual requirements in the set of aggregate requirements.

6. A non-transitory computer-readable storage medium coupled to one or more processors and having instructions stored thereon which, when executed by the one or more processors, cause the one or more processors to perform operations for providing one or more product designs using an intelligent design platform, the operations comprising:
   receiving, by a design generation system of the intelligent design platform, a product indicator that indicates a product that is to be designed;
   receiving a superset of tagged images comprising images responsive to the product indicator;
   defining a set of tagged images comprising tagged images from the superset of tagged images, the set of tagged images being defined based on a distribution of context represented in tags of the tagged images, wherein the distribution is one of even and uneven;
   transmitting, by the design generation system, a request to a contextual requirements system of the intelligent design platform, the request comprising the product indicator and requesting one or more contextual requirements;
   determining, by the contextual requirements system, a set of context models based on the product indicator and the set of tagged images, each context model in the set of context models being generated based on one or more scenes represented in a digital video, each scene depicting a contextual use of the product;
   providing, by the contextual requirements system, a set of contextual requirements to the design generation system based on one or more context models in the set of context models; and
   inputting, by the design generation system, a set of aggregate requirements to a generative design tool that generates the one or more product designs based on the set of aggregate requirements, the set of aggregate requirements comprising at least one contextual requirement from the set of contextual requirements.

7. The computer-readable storage medium of claim 6, wherein each tagged image depicts a respective scene represented in a digital video.

8. The computer-readable storage medium of claim 6, wherein operations further comprise providing context models by processing tagged images using photogrammetry.

9. The computer-readable storage medium of claim 6, wherein operations further comprise:
   receiving designer-provided requirements; and
   providing the set of aggregate requirements based on the designer-provided requirements and the set of contextual requirements, the set of aggregate requirements comprising at least one designer-provided requirement.

10. The computer-readable storage medium of claim 9, wherein providing the set of aggregate requirements based on the designer-provided requirements and the set of contextual requirements comprises comparing each of the designer-provided requirements to contextual requirements in the set of contextual requirements to selectively include the at least one contextual requirement from the set of contextual requirements in the set of aggregate requirements.

11. A system, comprising:
   a computing device; and
   a computer-readable storage device coupled to the computing device and having instructions stored thereon which, when executed by the computing device, cause the computing device to perform operations for providing one or more product designs using an intelligent design platform, the operations comprising:
      receiving, by a design generation system of the intelligent design platform, a product indicator that indicates a product that is to be designed;
      receiving a superset of tagged images comprising images responsive to the product indicator;
      defining a set of tagged images comprising tagged images from the superset of tagged images, the set of tagged images being defined based on a distribution of context represented in tags of the tagged images, wherein the distribution is one of even and uneven;
      transmitting, by the design generation system, a request to a contextual requirements system of the intelligent design platform, the request comprising the product indicator and requesting one or more contextual requirements;
      determining, by the contextual requirements system, a set of context models based on the product indicator and the set of tagged images, each context model in the set of context models being generated based on one or more scenes represented in a digital video, each scene depicting a contextual use of the product;
      providing, by the contextual requirements system, a set of contextual requirements to the design generation system based on one or more context models in the set of context models; and
      inputting, by the design generation system, a set of aggregate requirements to a generative design tool that generates the one or more product designs based on the set of aggregate requirements, the set of aggregate requirements comprising at least one contextual requirement from the set of contextual requirements.

12. The system of claim 11, wherein each tagged image depicts a respective scene represented in a digital video.

13. The system of claim 11, wherein operations further comprise providing context models by processing tagged images using photogrammetry.

14. The system of claim 11, wherein operations further comprise:
   receiving designer-provided requirements; and
   providing the set of aggregate requirements based on the designer-provided requirements and the set of contextual requirements, the set of aggregate requirements comprising at least one designer-provided requirement.

15. The system of claim 14, wherein providing the set of aggregate requirements based on the designer-provided requirements and the set of contextual requirements comprises comparing each of the designer-provided requirements to contextual requirements in the set of contextual requirements to selectively include the at least one contextual requirement from the set of contextual requirements in the set of aggregate requirements.

\* \* \* \* \*